US010243976B2

(12) United States Patent
Greeter

(10) Patent No.: US 10,243,976 B2
(45) Date of Patent: Mar. 26, 2019

(54) INFORMATION SECURITIES RESOURCE PROPAGATION FOR ATTACK PREVENTION

(71) Applicant: Bank of America Corporation, Charlotte, NC (US)

(72) Inventor: Jason Todd Greeter, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 149 days.

(21) Appl. No.: 15/442,204

(22) Filed: Feb. 24, 2017

(65) Prior Publication Data
US 2018/0248894 A1 Aug. 30, 2018

(51) Int. Cl.
*H04L 29/06* (2006.01)
*G06N 99/00* (2019.01)
*G06F 21/50* (2013.01)

(52) U.S. Cl.
CPC ......... *H04L 63/1416* (2013.01); *G06F 21/50* (2013.01); *G06N 99/002* (2013.01); *H04L 63/14* (2013.01); *H04L 63/1425* (2013.01)

(58) Field of Classification Search
CPC ........ G06F 21/50; G06F 21/55; G06F 21/552; G06F 21/554; H04L 63/14; H04L 63/1408; H04L 63/1416; H04L 63/1425; H04L 63/1433; H04L 63/1441; H04L 63/145
See application file for complete search history.

(56) References Cited

U.S. PATENT DOCUMENTS

| 7,135,701 B2 | 11/2006 | Amin et al. |
| 7,418,283 B2 | 8/2008 | Amin |
| 7,533,068 B2 | 5/2009 | Maassen van den Brink et al. |

(Continued)

FOREIGN PATENT DOCUMENTS

| AU | 2010249233 A1 | 6/2011 |
| CA | 2886849 A1 | 10/2016 |

(Continued)

*Primary Examiner* — Edward Zee
(74) *Attorney, Agent, or Firm* — Michael A. Springs; Moore & Van Allen PLLC; James C. Edwards

(57) ABSTRACT

A system for verifying resource propagations in real-time typically includes a classical computer apparatus and a quantum optimizer in communication with the classical computer apparatus. The quantum optimizer is configured to analyze resource propagation information related to previous resource propagations and confirmed attacks to generate a model for verifying resource propagations or mitigating potential attacks. When the classical computer apparatus receives indication of a present resource propagation, the classical computer apparatus transfers attributes of the present resource propagation to the quantum optimizer, which analyzes the resource propagation using the model to determine whether the resource propagation involves a potential attack. Based on the indication from the quantum optimizer, the classical computer apparatus attempts to mitigate the potential attack or allows the resource propagation to proceed. By employing a quantum optimizer to verify resource propagation, the system is able to verify the resource propagation request in real-time.

19 Claims, 8 Drawing Sheets

(56) References Cited

U.S. PATENT DOCUMENTS

| | | |
|---|---|---|
| 7,619,437 B2 | 11/2009 | Thom et al. |
| 7,639,035 B2 | 12/2009 | Berkley |
| 7,898,282 B2 | 3/2011 | Harris et al. |
| 8,008,942 B2 | 8/2011 | van den Brink et al. |
| 8,190,548 B2 | 5/2012 | Choi |
| 8,195,596 B2 | 6/2012 | Rose et al. |
| 8,283,943 B2 | 10/2012 | van den Brink et al. |
| 8,421,053 B2 | 4/2013 | Bunyk et al. |
| 8,744,075 B2 | 6/2014 | Tanaka |
| 8,897,449 B1 | 11/2014 | Broadbent |
| 9,207,672 B2 | 12/2015 | Williams et al. |
| 9,246,675 B2 | 1/2016 | Ding |
| 9,400,499 B2 | 7/2016 | Williams et al. |
| 9,537,660 B2 | 1/2017 | Wang et al. |
| 2004/0139000 A1 | 7/2004 | Amos |
| 2005/0010508 A1 | 1/2005 | Groz |
| 2006/0088157 A1 | 4/2006 | Fujii |
| 2006/0251247 A1 | 11/2006 | Akiyama et al. |
| 2008/0262990 A1* | 10/2008 | Kapoor .................. G06F 9/505 706/20 |
| 2012/0002008 A1 | 1/2012 | Valin et al. |
| 2013/0117200 A1 | 5/2013 | Thom |

FOREIGN PATENT DOCUMENTS

| | | |
|---|---|---|
| CN | 101834724 A | 9/2010 |
| CN | 101867474 A | 10/2010 |
| CN | 102025491 A | 4/2011 |
| CN | 102664732 A | 9/2012 |
| CN | 103200000 A | 7/2013 |
| CN | 103200001 A | 7/2013 |
| CN | 103312498 A | 9/2013 |
| CN | 103338448 A | 10/2013 |
| CN | 104504601 A | 4/2015 |
| EP | 2462717 A1 | 6/2012 |
| KR | 100563907 B1 | 3/2006 |
| WO | 2010105993 A2 | 9/2010 |
| WO | 2015149035 A1 | 10/2015 |

* cited by examiner

INFORMATION SECURITIES RESOURCE PROPAGATION FOR ATTACK PREVENTION

FIELD OF THE INVENTION

The present invention embraces a system for analyzing information securities resource propagation in real-time to prevent attacks and includes a classical computer apparatus and a quantum optimizer in communication with the classical computer apparatus. The quantum optimizer is configured to analyze information securities resource propagation to generate a model for verifying resource propagation. Subsequently, when the classical computer apparatus receives a resource propagation indication or request, the classical computer apparatus transfers resource propagation information to the quantum optimizer. The quantum optimizer analyzes the resource propagation information using the model to determine whether the resource propagation is authorized or an attack. Based on receiving an indication from the quantum optimizer of whether the resource propagation is authorized or an attack, the classical computer apparatus processes the resource propagation. By employing a quantum optimizer, instead of a classical computer, to verify the resource propagation request, the system is able to verify the resource propagation request in real-time or near real-time.

BACKGROUND

Verifying resource propagation typically involves processing significant volumes of data. Due to these significant volumes of data, it is often difficult to verify resource propagation in real-time. As such, a need exists for an improved way of verifying resource propagations.

SUMMARY

In one aspect, the present invention embraces a computerized system, and an associated method and computer program product, for information securities resource propagation analysis for attack prevention.

According to embodiments of the invention, a computer system for information securities resource propagation analysis for attack prevention, comprising a classical computer apparatus comprising a processor; a memory; and a resource propagation processing application that is stored in the memory and executable by the processor; a quantum optimizer in operative communication with the classical computer apparatus, the quantum optimizer comprising a quantum processor; and a quantum memory; wherein the resource propagation processing application is configured for transmitting historical resource propagation information and historical attack information to the quantum optimizer; wherein the quantum optimizer is configured for receiving the historical resource propagation information and historical attack information; analyzing the historical resource propagation information and historical attack information to determine one or more indicative attributes that may be indicative of attacks.

In some embodiments, the quantum optimizer is further configured for transmitting the indicative attributes to the classical computer apparatus for comparison to present attributes of present resource propagation for identification of potential attacks.

In some embodiments, the quantum optimizer is configured for determining one or more models for identification of potential attacks based on application of the one or more models to present information. In some such embodiments, the quantum optimizer is further configured for using the one or more models to determine the indicative attributes. In other such embodiments, the quantum optimizer is further configured for transmitting the one or more models to the classical computer apparatus; wherein the resource propagation processing application is further configured for receiving the one or more models from the quantum optimizer; input present attributes into the one or more models to identify potential attacks.

In some embodiments, the resource propagation processing application is further configured for receiving the indicative attributes from the quantum optimizer; and comparing the indicative attributes to present attributes to identify potential attacks. In some such embodiments, the resource propagation processing application is further configured for identifying a first resource propagation device having present attributes corresponding to an identified potential attack. In some of these embodiments, the resource propagation processing application is further configured for transmitting a command configured to isolate the first resource propagation device. In other such embodiments, the resource propagation processing application is further configured for transmitting a command to mitigate the identified potential attack.

In some embodiments, the resource propagation processing application is further configured for receiving, from one or more resource propagation devices, present attributes; and comparing the indicative attributes to present attributes to identify potential attacks.

In some embodiments, the resource propagation processing application is further configured for receiving, from one or more resource propagation devices, present attributes; and transmitting the present attributes; wherein the quantum computer is configured for receiving the present attributes; comparing the present attributes to the identified attributes to identify an identified potential attack; identifying a first resource propagation device corresponding to the identified potential attack; and transmitting, to the classical computing apparatus, an identity of the first resource propagation device for mitigation of the identified potential attack. In some such embodiments, the resource propagation processing application is further configured for receiving the identity of the first resource propagation device; and transmitting a command configured to mitigate the identified potential attack.

In some embodiments, the quantum computer is further configured for analyzing the historical resource propagation information and historical attack information to generate a model for verifying resource propagations, wherein the model is configured for real-time processing by the classical computer apparatus; wherein the resource propagation processing application is further configured for receiving an indication of a present resource propagation; identifying present attributes of the present resource propagation; analyzing the present attributes using the model to determine (i) whether the resource propagation is verified and (ii) a confidence of whether the resource propagation is verified; and based on analyzing the present attributes using the model to determine (i) whether the resource propagation is verified and (ii) the confidence of whether the resource propagation is verified, determining an attack is unlikely and thereby allowing the resource propagation to proceed without mitigation.

In some embodiments, the quantum computer is further configured for analyzing the historical resource propagation information and historical attack information to generate a model for verifying resource propagations, wherein the model is configured for real-time processing by the quantum computer; wherein the resource propagation processing application is further configured for receiving an indication of a present resource propagation; identifying present attributes of the present resource propagation; transmitting the present attributes to the quantum computer for processing; wherein the quantum computer is further configured for analyzing the present attributes using the model to determine (i) whether the resource propagation is verified and (ii) a confidence of whether the resource propagation is verified; and based on analyzing the present attributes using the model to determine (i) whether the resource propagation is verified and (ii) the confidence of whether the resource propagation is verified, determining an attack is unlikely and thereby allowing the resource propagation to proceed without mitigation.

In some embodiments, the quantum computer is further configured for analyzing the historical resource propagation information and historical attack information to generate a first model for verifying resource propagations, wherein the first model is configured for real-time processing by the classical computer apparatus; analyzing the historical resource propagation information and historical attack information to generate a second model for verifying resource propagations, wherein the second model is configured for real-time processing by the quantum computer; and transmitting the first model to the classical computer apparatus; wherein the resource propagation processing application is further configured for receiving an indication of a present resource propagation; identifying present attributes of the present resource propagation; analyzing the present attributes using the first model to determine (i) whether the resource propagation is verified and (ii) a confidence of whether the resource propagation is verified; and based on analyzing the present attributes using the first model to determine (i) whether the resource propagation is verified and (ii) the confidence of whether the resource propagation is verified, determining that a quantum computing analysis is necessary to achieve a threshold confidence of whether the resource propagation is verified; and in response, transmitting the present attributes to the quantum computer for analysis. In some such embodiments, the quantum computer is further configured for analyzing the present attributes using the second model to determine (i) whether the resource propagation is verified and (ii) a confidence of whether the resource propagation is verified; and based on analyzing the present attributes using the second model to determine (i) whether the resource propagation is verified and (ii) the confidence of whether the resource propagation is verified, transmitting to the classical computer apparatus an indication of whether the resource propagation is verified. In some of these embodiments, the resource propagation processing application is further configured for receiving the indication of whether the resource propagation is verified; and in response to receiving an indication that the resource propagation is not verified, transmitting a command configured to mitigate the identified potential attack. In other such embodiments, the resource propagation processing application is further configured for receiving the indication of whether the resource propagation is verified; and in response to receiving an indication that the resource propagation is verified, allowing the resource propagation to proceed without mitigation.

According to embodiments of the invention, a computer system for information securities resource propagation analysis for attack prevention, comprising a classical computer apparatus comprising a processor; a memory; and a resource propagation processing application that is stored in the memory and executable by the processor; a quantum optimizer in operative communication with the classical computer apparatus, the quantum optimizer comprising a quantum processor; and a quantum memory; wherein the resource propagation processing application is configured for receiving historical resource propagation information and historical attack information from one or more resource propagation devices; transmitting the historical resource propagation information and the historical attack information to the quantum optimizer; wherein the quantum optimizer is configured for receiving the historical resource propagation information and historical attack information; and analyzing the historical resource propagation information and historical attack information to generate a first model for verifying resource propagations, wherein the first model is configured for real-time processing by the quantum computer; wherein the resource propagation processing application is further configured for receiving an indication of a present resource propagation from one of the one or more resource propagation devices; identifying present attributes of the present resource propagation; and transmitting the present attributes to the quantum computer; wherein the quantum computer is further configured for analyzing the present attributes using the first model to determine (i) whether the resource propagation is verified and (ii) a confidence of whether the resource propagation is verified; based on analyzing the present attributes using the first model to determine (i) whether the resource propagation is verified and (ii) the confidence of whether the resource propagation is verified, determining a conclusion indicating whether attack mitigation should be initiated or the resource propagation should be allowed to proceed without attack mitigation; and transmitting the conclusion to the classical computer apparatus.

According to embodiments of the invention, a computer system for information securities resource propagation analysis for attack prevention includes a classical computer apparatus comprising a processor; a memory; and a resource propagation processing application that is stored in the memory and executable by the processor; a quantum optimizer in operative communication with the classical computer apparatus, the quantum optimizer comprising a quantum processor; and a quantum memory; wherein the resource propagation processing application is configured for receiving an indication of a present resource propagation from one of one or more resource propagation devices; identifying present attributes of the present resource propagation; and transmitting the present attributes to the quantum computer; wherein the quantum computer is configured for analyzing the present attributes using a first model to determine (i) whether the resource propagation is verified and (ii) a confidence of whether the resource propagation is verified, wherein the first model was generated by correlating historical resource propagation information and historical attack information to identify resource propagation attributes indicative of potential attacks; based on analyzing the present attributes using the first model to determine (i) whether the resource propagation is verified and (ii) the confidence of whether the resource propagation is verified, determining a conclusion indicating whether attack mitigation should be initiated or the resource propagation should be allowed to proceed without attack mitigation; and transmitting the conclusion to the classical computer apparatus.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
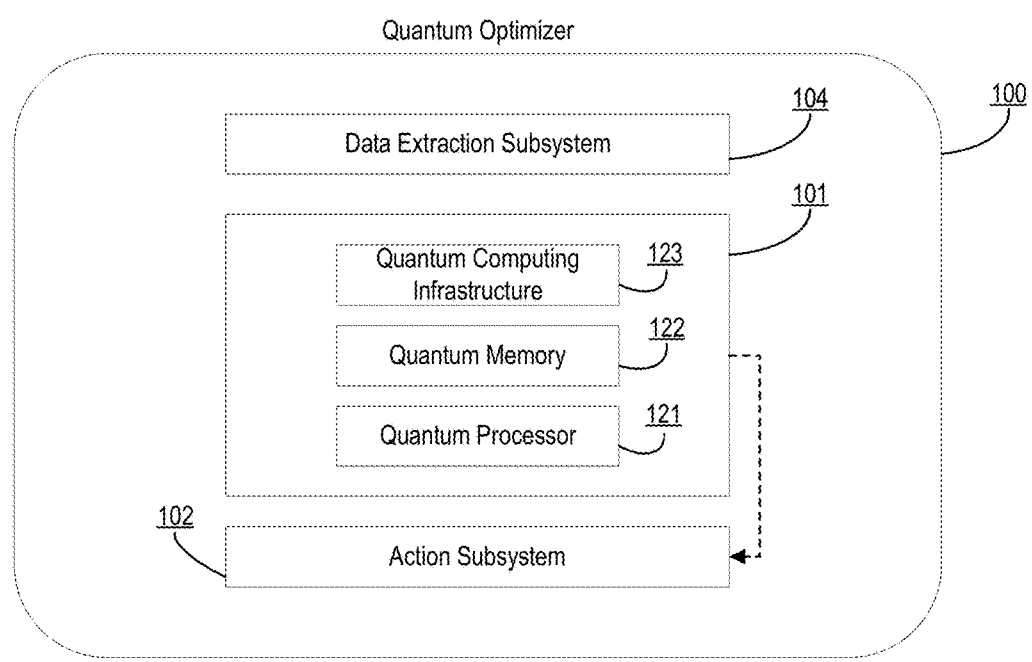
Figure 2:
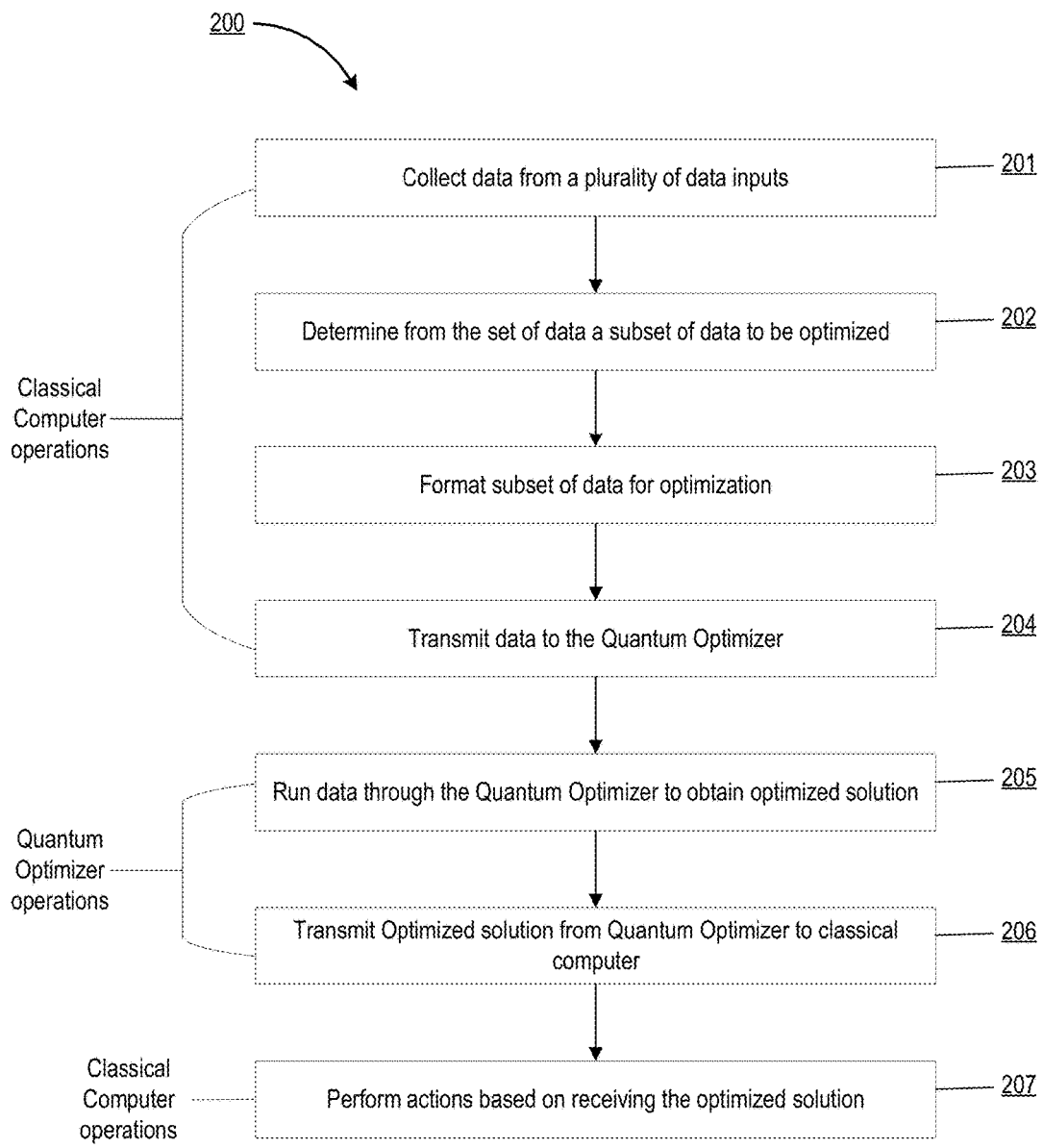
Figure 3:
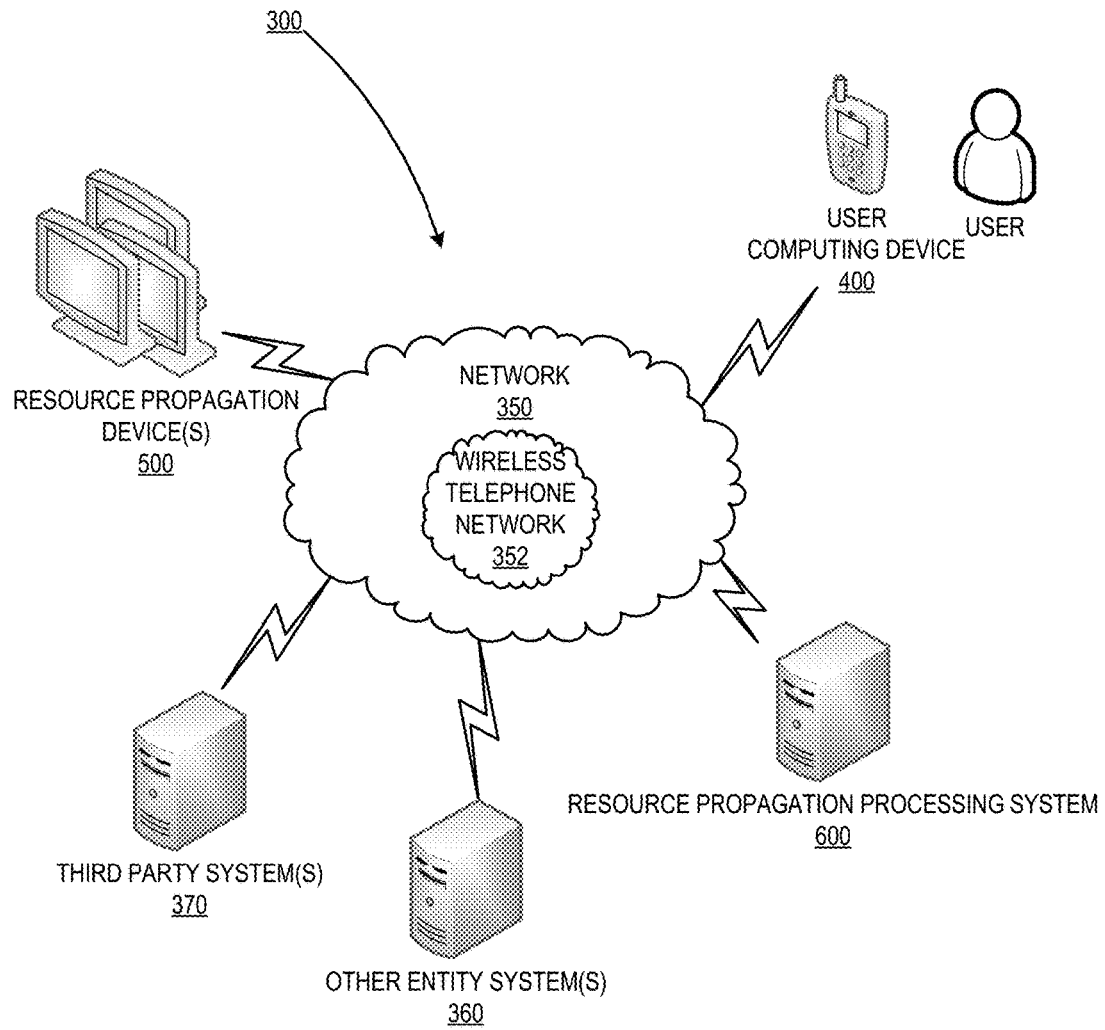
Figure 4:
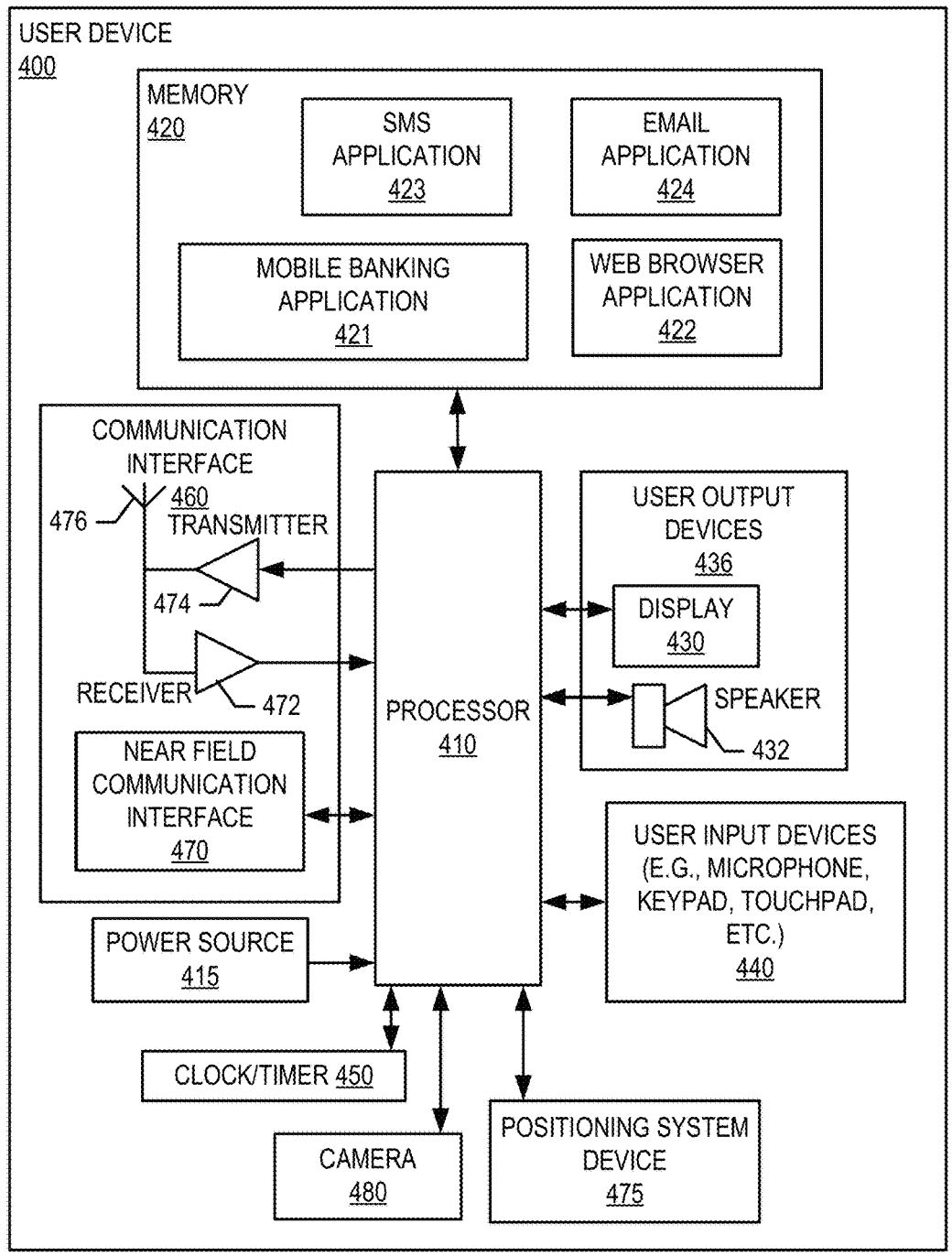
Figure 5:
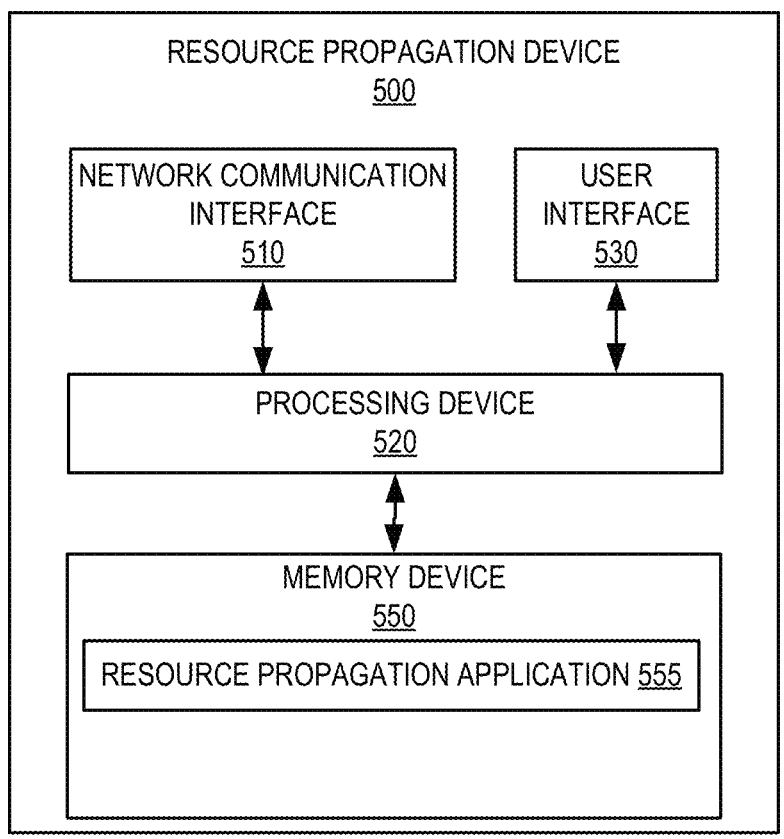
Figure 6:
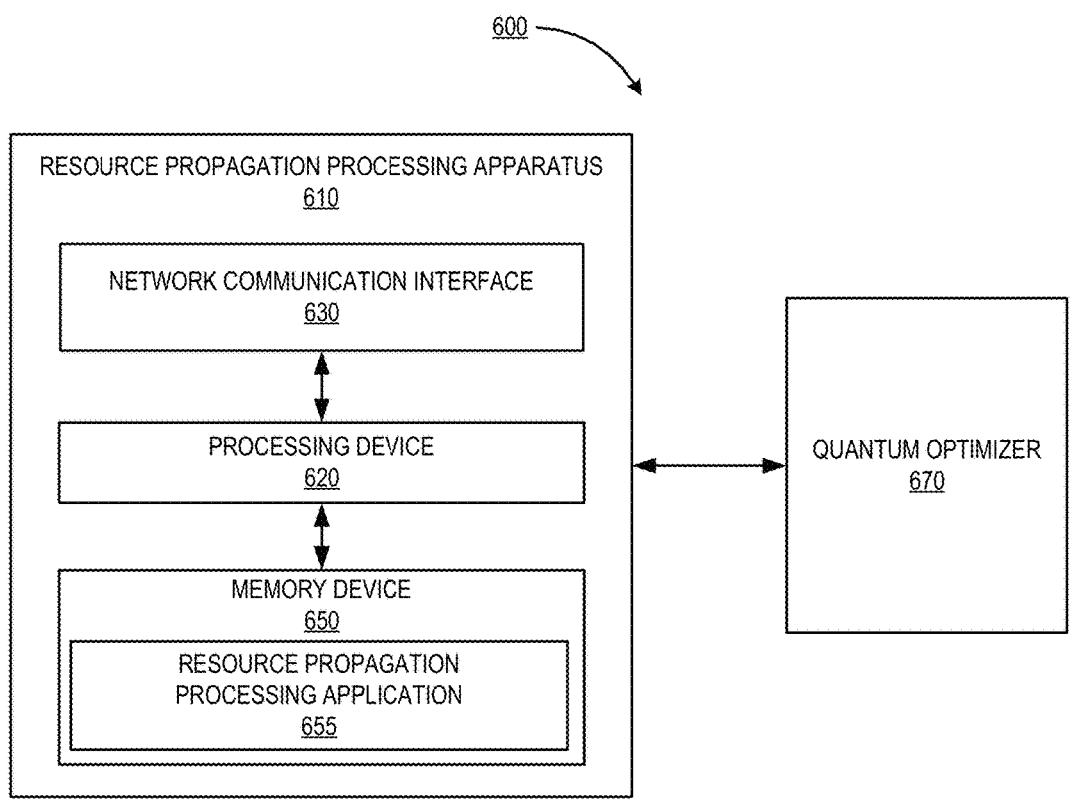
Figure 7A:
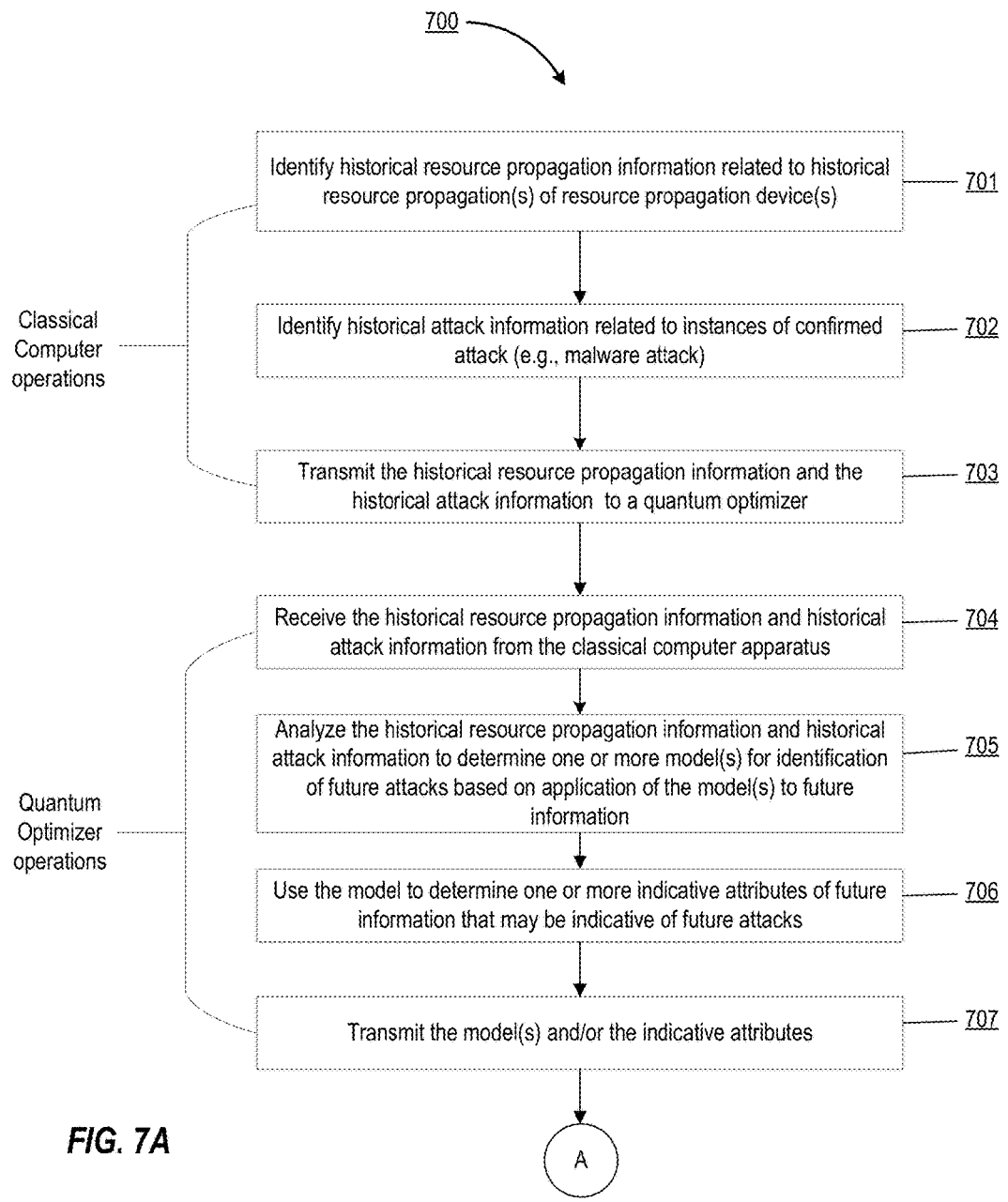
Figure 7B:
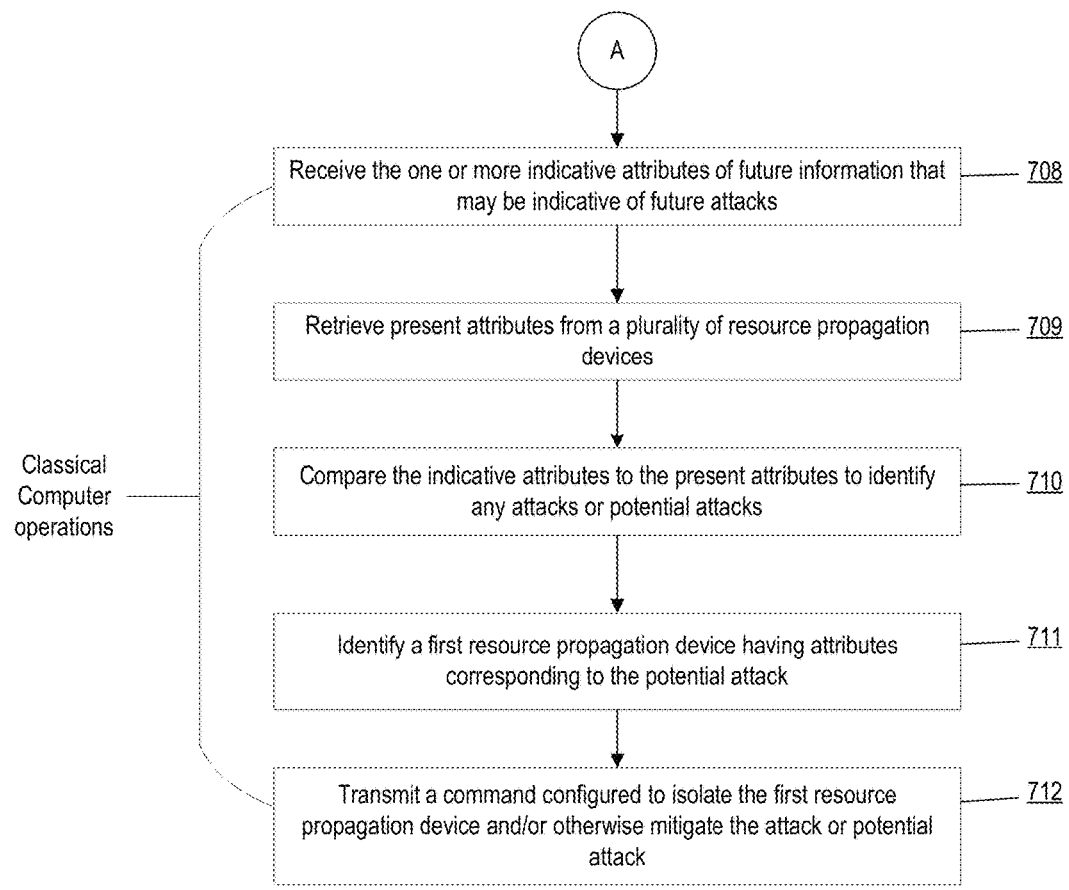

Having thus described embodiments of the invention in general terms, reference will now be made the accompanying drawings, wherein:

FIG. 1 is a schematic diagram of an exemplary quantum optimizer that can be used in parallel with a classical computer to solve optimization problems;

FIG. 2 depicts a method of solving optimization problems by using a classical computer in conjunction with a quantum optimizer;

FIG. 3 depicts an operating environment in accordance with an aspect of the present invention;

FIG. 4 schematically depicts a user device in accordance with an aspect of the present invention;

FIG. 5 schematically depicts a resource propagation device in accordance with an aspect of the present invention;

FIG. 6 schematically depicts a resource propagation processing system in accordance with an aspect of the present invention FIGS. 7A-7B depict a method for verifying resource propagation in real-time in accordance with an aspect of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As discussed above, embodiments of the present invention embraces a system for analyzing information securities resource propagation in real-time to prevent attacks and includes a classical computer apparatus and a quantum optimizer in communication with the classical computer apparatus. The quantum optimizer is configured to analyze information securities resource propagation to generate a model for verifying resource propagation. Subsequently, when the classical computer apparatus receives a resource propagation indication or request, the classical computer apparatus transfers resource propagation information to the quantum optimizer. The quantum optimizer analyzes the resource propagation information using the model to determine whether the resource propagation is authorized or an attack. Based on receiving an indication from the quantum optimizer of whether the resource propagation is authorized or an attack, the classical computer apparatus processes the resource propagation. By employing a quantum optimizer, instead of a classical computer, to verify the resource propagation request, the system is able to verify the resource propagation request in real-time or near real-time.

More particularly, embodiments of the invention solve the problem of how to leverage huge amounts of data from key network devices in order to identify an attack in real-time or predict a future attack. An attack may be or include malware infection on entity network systems and the like. A quantum optimizer generates one or more models based on data collected from key network devices. Then, when a resource propagation instance occurs or is expected to occur, the quantum optimizer applies the one or more models to the circumstances of the resource propagation. Thus, the system may identify what to protect, how to protect, potentially moving data and the like.

As used herein, a quantum computer is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Regardless of the particular type of quantum computer implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to 2n states simultaneously. By comparison, a classical computer can only be in one of the 2n states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Despite the seemingly limitless possibilities of quantum computers, present quantum computers are not yet substitutes for general purpose computers. Instead, quantum computers can outperform classical computers in a specialized set of computational problems. Principally, quantum computers have demonstrated superiority in solving optimization problems. Generally speaking, the term "optimization problem" as used throughout this application describe a problem of finding the best solution from a set of all feasible solutions. In accordance with some embodiments of the present invention, quantum computers as described herein are designed to perform adiabatic quantum computation and/or quantum annealing. Quantum computers designed to perform adiabatic quantum computation and/or quantum annealing are able to solve optimization problems as contemplated herein in real time or near real time.

Embodiments of the present invention make use of quantum ability of optimization by utilizing a quantum computer in conjunction with a classical computer. Such a configuration enables the present invention to take advantage of quantum speedup in solving optimization problems, while avoiding the drawbacks and difficulty of implementing quantum computing to perform non-optimization calculations. Examples of quantum computers that can be used to solve optimization problems parallel to a classic system are described in, for example, U.S. Pat. No. 9,400,499, U.S. Pat. No. 9,207,672, each of which is incorporated herein by reference in its entirety.

FIG. 1 is a schematic diagram of an exemplary Quantum Optimizer 100 that can be used in parallel with a classical computer to solve optimization problems. The Quantum Optimizer 100 typically includes a Data Extraction Subsystem 104, a Quantum Computing Subsystem 101, and an Action Subsystem 105. As used herein, the term "subsystem" generally refers to components, modules, hardware, software, communication links, and the like of particular components of the system. Subsystems as contemplated in embodiments of the present invention are configured to perform tasks within the system as a whole.

As depicted in FIG. 1, the Data Extraction Subsystem 104 communicates with the network to extract data for optimization. It will be understood that any method of communication between the Data Extraction Subsystem 104 and the network is sufficient, including but not limited to wired communication, Radiofrequency (RF) communication, Bluetooth®, WiFi, and the like. The Data Extraction Subsystem 104 then formats the data for optimization in the Quantum Computing Subsystem.

As further depicted in FIG. 1, the Quantum Computing Subsystem 101 includes a Quantum Computing Infrastructure 123, a Quantum Memory 122, and a Quantum Processor 121. The Quantum Computing Infrastructure 123 includes physical components for housing the Quantum Processor 121 and the Quantum Memory 122. The Quantum Computer Infrastructure 123 further includes a cryogenic refrigeration system to keep the Quantum Computing Subsystem 101 at the desired operating temperatures. In general, the Quantum Processor 121 is designed to perform adiabatic quantum computation and/or quantum annealing to optimize data received from the Data Extraction Subsystem 104. The Quantum Memory 122 typically includes a plurality of qubits used for storing data during operation of the Quantum Computing Subsystem 101. In general, qubits are any two-state quantum mechanical system. It will be understood that the Quantum Memory 122 may include any such two-state quantum mechanical system, such as the polarization of a single photon, the spin of an electron, and the like.

The Action Subsystem 102 communicates the optimized data from the Quantum Computing Subsystem 101 over the network. It will be understood that any method of communication between the Data Extraction Subsystem 104 and the network is sufficient, including but not limited to wired communication, Radiofrequency (RF) communication, Bluetooth® WiFi, and the like.

FIG. 2 depicts a method 200 of solving optimization problems by using a classical computer in conjunction with a quantum optimizer. As depicted in FIG. 2, a classical computer begins the method at step 201 by collecting data from a plurality of inputs. At step 202, the classical computer then determines from the set of data collected at step 201 a subset a data to be optimized. The classical computer then formats the subset of data for optimization at step 203. At step 204, the classical computer transmits the formatted subset of data to the Quantum Optimizer. The Quantum Optimizer runs the data to obtain the optimized solution at 205. The Quantum Optimizer then transmits the optimized data back to the classical computer at step 206. Finally, the classical computer can perform actions based on receiving the optimized solution at step 207.

In one aspect, the present invention embraces a method of verifying a resource propagation (e.g., a data transfer or process, as further described below) in real-time.

An entity that processes resource propagation typically verifies various aspects of a resource propagation once the entity receives a resource propagation request or indication. For example, the entity may verify the identity of the sender and/or recipient of a resource propagation, which may refer to resource propagation within a single network device or between or among two or three or more network devices, respectively. A resource propagation may also refer to use of data to perform one or more computing processes or processing steps executed solely on a single network device or on two or more network devices simultaneously or serially. The resource propagation may be, include or relate to data inputs that are present prior to the resource propagation, present during resource propagation and/or after resource propagation. Such data may be collected and analyzed to formulate one or more models for real-time analysis of present resource propagation indications or requests as discussed in further detail below.

In this regard, an entity may not be permitted to complete resource propagation involving certain inbound or outbound network systems. More broadly, the entity may verify whether a resource propagation involves unauthorized activity. Thus, the resource propagation might not be authorized by the sender or recipient or might otherwise involve unauthorized activity. Verifying resource propagations typically involves processing significant volumes of data. This volume of data is particularly significant for international resource propagation (e.g., when either the sender or recipient (network systems, entities or the like) of a resource propagation is located in a different country than the entity processing the resource propagation). Due to these significant volumes of data, certain resource propagations are typically not verified in real-time by existing solutions. By way of another example, resource propagation may refer to performing one or more process steps or serving as a gateway or network node for communication or forwarding instructions or data. In such a situation, logs of the communications or instruction transfers may be saved and stored on key network devices.

As noted, however, the present invention embraces a method of verifying a resource propagation in real-time. In this regard, a quantum optimizer, instead of a classical computer, is typically employed to verify a particular resource propagation. In particular, a quantum optimizer may initially analyze information regarding previous resource propagation to generate a model that may be used for verifying resource propagation. Thereafter, when a processing system of the entity receives a resource propagation request, information regarding the resource propagation request is provided to the quantum optimizer. The quantum optimizer then analyzes the information regarding the resource propagation request using the previously determined model to verify the resource propagation request. By employing a quantum optimizer in this manner, the present invention is able to verify resource propagation in real-time (e.g., within a few seconds of receiving a resource propagation request, or in some cases, an indication).

In some embodiments, an "entity" as used herein may be any institution employing information technology resources and particularly technology infrastructure configured for large scale processing of resource propagations. As such, the entity may be any institution, group, association, financial institution, establishment, company, union, authority or the like, employing information technology resources for the processing of resource propagations.

As described herein, a "user" may be an individual associated with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer. In other embodiments, a user may be a party (e.g., an individual or organization) sending, receiving, or otherwise involved with a resource propagation.

FIG. 3 provides a block diagram illustrating an operating environment 300, in accordance with an embodiment of the present invention. As illustrated in FIG. 3, the operating environment 300 typically includes a user device 400, a resource propagation device 500, and a resource propagation processing system 600. The resource propagation processing system 600 is typically maintained by an entity (e.g., financial institution) that processes resource propagations. The user device 400 and/or resource propagation device 500 may be configured to initiate a resource propagation request. This resource propagation request is then transmitted (either directly or indirectly) over a network 350 to the resource propagation processing system 600 for processing. The network 350 may include a local area network (LAN), a wide area network (WAN), and/or a global area network (GAN). The network 350 may provide for wireline, wireless, or a combination of wireline and wireless communication between devices in the network. In one embodiment, the network 350 includes the Internet. In one embodiment, the network 350 includes a wireless telephone network 352. The resource propagation processing system 600 may also be in network communication with other devices, such as other entity systems 360 and/or third party systems 370, which may also process aspects of a resource propagation request or otherwise facilitate a resource propagation.

FIG. 4 provides a block diagram illustrating the user device 400 of FIG. 3 in more detail, in accordance with embodiments of the invention. In some embodiments, the user device 400 is a mobile device, such as mobile telephone. However, it should be understood, however, that a mobile telephone is merely illustrative of one type of mobile device that may benefit from, employ, or otherwise be involved with embodiments of the present invention and, therefore, should not be taken to limit the scope of embodiments of the present invention. Other types of mobile devices may include portable digital assistants (PDAs), pagers, mobile televisions, gaming devices, laptop computers, cameras, video recorders, audio/video player, radio, GPS devices, or any combination of the aforementioned. In addition, the user device 400 may be a computing device that is not a mobile device, such as a desktop computer.

The user device 400 typically includes a processor 410 communicably coupled to such devices as a memory 420, user output devices 436, user input devices 440, a communication interface 460, a power source 415, a clock or other timer 450, a camera 480, and a positioning system device 475. The processor 410, and other processors described herein, typically includes circuitry for implementing communication and/or logic functions of the user device 400. For example, the processor 410 may include a digital signal processor device, a microprocessor device, and various analog to digital converters, digital to analog converters, and/or other support circuits. Control and signal processing functions of the user device 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the user device 400 to transmit and receive web content, such as, for example, location-based content and/or other web page content, according to a Wireless Application Protocol (WAP), Hypertext Transfer Protocol (HTTP), and/or the like.

The processor 410 is typically configured to use the communication interface 460 to communicate with one or more other devices on the network 350. In this regard, the communication interface 460 typically includes an antenna 476 operatively coupled to a transmitter 474 and a receiver 472 (together a "transceiver"). The processor 410 is typically configured to provide signals to and receive signals from the transmitter 474 and receiver 472, respectively. The signals may include signaling information in accordance with the air interface standard of the applicable cellular system of the wireless telephone network 352. In this regard, the user device 400 may be configured to operate with one or more air interface standards, communication protocols, modulation types, and access types. By way of illustration, the user device 400 may be configured to operate in accordance with any of a number of first, second, third, and/or fourth-generation communication protocols and/or the like. For example, the user device 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 400 may also be configured to operate in accordance with non-cellular communication mechanisms, such as via a wireless local area network (WLAN) or other communication/data networks.

The communication interface 460 may also include a near field communication (NFC) interface 470. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 470 may include a smart card, key card, proximity card, Bluetooth® device, radio frequency identification (RFID) tag and/or reader, transmitter, receiver, and/or the like. In some embodiments, the NFC interface 470 communicates information via radio, infrared (IR), and/or optical transmissions. In some embodiments, the NFC interface 470 is configured to operate as an NFC transmitter and/or as an NFC receiver (e.g., an NFC reader). Also, it will be understood that the NFC interface 470 may be embedded, built, carried, and/or otherwise supported in and/or on the user device 400. In some embodiments, the NFC interface 470 is not supported in and/or on the user device 400, but the NFC interface 470 is otherwise operatively connected to the user device 400 (e.g., where the NFC interface 470 is a peripheral device plugged into the user device 400). Other apparatuses having NFC interfaces mentioned herein may be configured similarly. In some embodiments, the NFC interface 470 of the user device 400 is configured to contactlessly and/or wirelessly communicate information to and/or from a corresponding NFC interface of another apparatus (e.g., another mobile or computing device).

The user device 400 typically has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410. The user input devices 440, which allow the user device 400 to receive data from a user, may include any of a number of devices allowing the user device 400 to receive data from a user, such as a keypad, keyboard, touch-screen, touchpad, microphone, mouse, joystick, other pointer device, button, soft key, and/or other input device(s). The user interface may also include a camera 480, such as a digital camera.

The user device 400 may also include a positioning system device 475 that is configured to be used by a positioning system to determine a location of the user device 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate location of the user device 400. In other embodiments, the positioning system device 475 includes a proximity sensor or transmitter, such as an RFID tag, that can sense or be sensed by devices known to be located proximate a location to determine that the user device 400 is located proximate these known devices.

The user device 400 further includes a power source 415, such as a battery, for powering various circuits and other devices that are used to operate the user device 400. Embodiments of the user device 400 may also include a clock or other timer 450 configured to determine and, in some cases, communicate actual or relative time to the processor 410 or one or more other devices.

The user device 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which include computer-executable instructions/code executed by the processor 410 to implement the functions of the user device 400 described herein. For example, the memory 420 may include such applications as a conventional web browser application 422 and/or a mobile banking application 421. These applications also typically provide a graphical user interface (GUI) on the display 430 that allows the user to communicate with the user device 400, the resource propagation processing system 600, and/or other devices or systems. In one embodiment of the invention, when the user decides to enroll in an online banking program, the user downloads or otherwise obtains the mobile banking system client application from an entity system (e.g., an application server). In other embodiments of the invention, the user interacts with the resource propagation processing system 600 via the web browser application 422 in addition to, or instead of, the mobile banking application 421. The user of the user device 400 may use the web browser application 422 and/or the mobile banking application 421 to administer one or more of the attack prevention processes discussed herein.

The memory 420 can also store any of a number of pieces of information, and data, used by the user device 400 and the applications and devices that make up the user device 400 or are in communication with the user device 400 to implement the functions of the user device 400 and/or the other systems described herein. For example, the memory 420 may include such data as user authentication information.

The resource propagation device 500 is typically a network device, such as a device within any network in which relevant data is processed and/or passes through and which may present a security risk for the entity. Referring now to FIG. 5, the resource propagation device 500 includes various features, such as a network communication interface 510, a processing device 520, a user interface 530, and a memory device 550. The network communication interface 510 includes a device that allows the resource propagation device 500 to communicate over the network 350 (shown in FIG. 3). In one embodiment of the invention, a resource propagation application 555 may communicate with other devices and/or applications discussed herein in order to capture, store and/or communicate metadata or information related to data processing and/or communication performed by the resource propagation device 500. The resource propagation device 500 may interact with various other devices/system to facilitate performance of the resource propagation as well as gathering of data, analysis of the data and real-time attack prevention, as discussed herein.

As used herein, a "processing device," such as the processing device 520, generally refers to a device or combination of devices having circuitry used for implementing the communication and/or logic functions of a particular system. For example, a processing device 520 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 520 may further include functionality to operate one or more software programs based on computer-executable program code thereof, which may be stored in a memory. As the phrase is used herein, a processing device 520 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 530 generally includes a plurality of interface devices and/or software that allow a user to input commands and data to direct the processing device to execute instructions. For example, the user interface 530 presented in FIG. 5 may include a graphical user interface (GUI) or an interface to input computer-executable instructions that direct the processing device 520 to carry out specific functions. The user interface 530 employs certain input and output devices to input data received from the customer or output data to the customer. These input and output devices may include a display, mouse, keyboard, button, touchpad, touch screen, microphone, speaker, LED, light, joystick, switch, buzzer, bell, and/or other customer input/output device for communicating with one or more users.

As used herein, a "memory device" 550 generally refers to a device or combination of devices that store one or more forms of computer-readable media for storing data and/or computer-executable program code/instructions. Computer-readable media is defined in greater detail below. For example, in one embodiment, the memory device 550 includes any computer memory that provides an actual or virtual space to temporarily or permanently store data and/or commands provided to the processing device 520 when it carries out its functions described herein.

In some embodiments, the resource propagation device 500 may include a contactless interface. In one embodiment, the contactless interface is an NFC interface. The contactless interface may be configured to contactlessly and/or wirelessly send and/or receive information over relatively short ranges (e.g., within four inches, within three feet, etc.). The contactless interface may include a transmitter, receiver, smart card, key card, proximity card, Bluetooth® device, radio frequency identification (RFID) tag and/or reader, and/or the like. In some embodiments, the contactless interface communicates information via radio, IR, and/or optical transmissions. Generally, the contactless interface is configured to operate as a contactless transmitter and/or as a contactless receiver. The contactless interface functions to facilitate transactions with users utilizing an external apparatus, for example, the user device 400, capable of contactless communication. Also, it will be understood that the contactless interface may be embedded, built, carried, and/or otherwise supported in and/or on the resource propagation device 500. In some embodiments, the contactless interface is not supported in and/or on the resource propagation device 500, but is otherwise operatively connected to the resource propagation device 500 (e.g., where the contactless interface is a peripheral device plugged into the resource propagation device 500). The contactless interface of the resource propagation device 500 may be configured to contactlessly and/or wirelessly communicate information to and/or from an external apparatus (e.g., the user device 400).

The resource propagation device 500, may further include one or more additional devices to help execute one or more of the steps and/or processes discussed herein. In some embodiments the resource propagation device 500 are configured to authenticate data transmissions from originating network devices by establishing an operative communication channel with the resource propagation processing apparatus 610. For instance, the resource propagation device 500 may transmit signal(s) with encoded data specific to the resource propagation processing apparatus 610 that other devices cannot recognize and/or decode. The resource propagation processing apparatus 610 may receive the encoded data and a specific decoding module of the resource propagation processing apparatus 610 may decode the signal and transmit an augmented signal to a receiver on the resource propagation device 500. The augmented signal may include the decoded signal along with a token identifier of the resource propagation processing apparatus 610, one or more user parameters (such as authentication credentials, or indication of a successful validation of credentials received at the resource propagation processing apparatus 610, such as the user's fingerprint or passcode) and the like. The resource propagation device 500 (optionally in conjunction with another system), may then analyze the augmented signal and authenticate the data transmission based on authenticating the resource propagation processing apparatus 610, and allow the transmission to proceed.

FIG. 6 depicts the resource propagation processing system 600 in more detail. The resource propagation processing system 600 typically includes a resource propagation processing apparatus 610. The resource propagation processing apparatus 610 is typically a device that functions as a processing center for one or more of the steps and/or processes discussed herein. For example, the resource propagation device 500 may be or include a classical computer having a network communication interface 630, a processing device 650, and a memory device 650. The resource propagation processing apparatus 610 also typically includes a resource propagation processing application 655 that is configured to perform various aspects of processing a resource propagation to prevent an attack as described herein. In order to facilitate real-time verification of resource propagation, the resource propagation processing apparatus 610 is typically in communication with a quantum optimizer 670. The quantum optimizer is typically configured to perform various aspects of verifying resource propagation requests as described herein. An exemplary quantum optimizer is depicted in more detail in FIG. 1.

Referring now to FIGS. 7A-7B, a method 700 is provided for verifying resource propagations in real-time. Some or all the steps of method 700 may be performed by the resource propagation processing system 600.

Initially, at block 701, the resource propagation processing apparatus 610, which as previously noted is typically a classical computer (e.g., a binary, digital electronic computer), identifies historical resource propagation information related to historical resource propagation(s). At block 702, the resource propagation processing apparatus 610 identifies historical attack information related to instances of confirmed attacks (e.g., malware attacks). This information is typically retrieved or received from one or more resource propagation device(s), such as one or more key network devices. This information typically includes information indicating whether these previous resource propagations were successfully "verified", which as used herein refers to a resource propagation that was not associated with or did not cause an attack or circumstances leading to or better enabling an attack. In addition, other information that may correlate with whether or not the previous resource propagation were successfully verified may also be identified. For example, this information may include information regarding: the identities of the transmitting node of a network and/or the receiving node of a network of a particular resource propagation (or data transmission in this example); the location of resource propagation device(s) (e.g., server, workstation, mobile device, server bank, and the like) involved in the resource propagation, such as the location(s) of network nodes functioning as transmitter, receiver, buffering system, formatting system, preliminary processing system, processing system or other network nodes; the method(s) used to authenticate the resource propagation, if applicable; any resource propagation limitations placed on the resource(s) involved in a particular resource propagation; the identities and/or locations of entities (e.g., companies, corporations) that provide the resource(s) involved in a particular resource propagation; and any other information related to the transmitter, receiver or processor of a particular resource propagation.

At block 703, the resource propagation processing apparatus 610 transmits the identified information to the quantum optimizer 670. In some embodiments, the resource propagation processing apparatus 610 may format the resource propagation information for optimization by the quantum optimizer 670 before transmitting the resource propagation information to the quantum optimizer 670.

At block 704, the quantum optimizer 670 receives the information from the resource propagation processing apparatus 610.

Next, at block 705, the quantum optimizer 670 analyzes the historical resource propagation information and historical attack information to generate a first model for verifying resource propagations. In particular, the quantum optimizer 670 performs adiabatic quantum computation and/or quantum annealing using the information to generate an optimal model that may be used to determine whether a particular resource propagation should be verified or whether a potential attack is likely, and therefore attack mitigation should be initiated.

Accordingly, this model may subsequently be used by the quantum optimizer 670 to determine whether a particular resource propagation should be verified. In some embodiments, this model generated by the quantum optimizer 670 is a model that may be evaluated by a quantum computer (e.g., the quantum optimizer 670), but not by a classical computer.

In some embodiments, as illustrated by blocks 706 and 707, the quantum optimizer 670 uses the model to determine one or more indicative attributes of future information (related to future resource propagation(s)) that may be indicative of future attacks. Then, the quantum optimizer may transmit the indicative attributes and/or the model to the classical computer apparatus for application of the attributes or model to future information and analysis of resource propagations.

At block 708, the resource propagation processing apparatus 610 may receive the indicative attributes (and/or the model) from the quantum optimizer. At block 709, the resource propagation processing apparatus 610 identifies a present resource propagation and may receive or retrieve, from one or more resource propagation devices related to a first resource propagation, present attributes related to the resource propagation devices (or other resource propagation devices). These present attributes may include information that may correlate with whether or not the resource propagation should be verified (or mitigated) and typically includes information that the quantum optimizer 670 may use to evaluate the resource propagation using the model.

In some embodiments, as shown in block 710, the resource propagation processing apparatus 610 compares the indicative attributes (and/or the model itself) may be used to identify any attacks or potential attacks. Then, the resource propagation processing apparatus 610 may identify a first resource propagation device having attributes corresponding to the potential attack. Finally, in some embodiments, the resource propagation processing apparatus 610 transmits a command configured to isolate the first resource propagation device and/or otherwise mitigate the attack or potential attack, as represented by block 712.

In other embodiments, the quantum optimizer applies the model and/or the indicative attributes to the present attributes to determine whether the resource propagation should be verified or mitigated. This may be done by the resource propagation processing apparatus 610 transmitting the present attributes to the quantum optimizer for processing, including comparing the present attributes to the indicative attributes and/or applying the present attributes to the model. In some embodiments, the resource propagation processing apparatus 610 may first format the present attributes for optimization by the quantum optimizer 670 before transmitting the present attributes to the quantum optimizer 670.

In some embodiments, the quantum optimizer 670 analyzes the present attributes using the model to determine whether to verify the resource propagation. Based on this analysis, the quantum optimizer 670 transmits to the resource propagation processing apparatus 610 an indication of whether the resource propagation is verified or requires mitigation to prevent an attack.

In such a case, the resource propagation processing apparatus 610 receives from the quantum optimizer 670 the indication of whether the resource propagation is verified. Based on the indication of whether the resource propagation is verified, the resource propagation processing apparatus 610 may allow the resource propagation to proceed without initiating any mitigation. For example, if the resource propagation is verified, then the resource propagation processing apparatus 610 may approve the resource propagation and transmit an approval to the resource propagation device performing the resource propagation initiating the resource propagation and/or other device(s) involved in the resource propagation. In some embodiments, however, no affirmative action is taken, but rather, the resource propagation is merely allowed to progress normally. That said, if the first resource propagation request is not verified, then the resource propagation processing apparatus 610 may deny the resource propagation and transmit a denial to the resource propagation device performing the resource propagation devices or systems involved in processing the resource propagation. Alternatively, if the resource propagation request is not verified, then the resource propagation processing apparatus 610 may flag the resource propagation for further analysis (e.g., by an analyst employed by the entity). Furthermore, in some cases, the resource propagation processing apparatus 610 may send commands for blocking the resource propagation from progressing through the network to additional devices by soft (firewall or other security mechanism) or hard (physical disconnection) measures.

In some embodiments, the quantum optimizer 670 is configured to update the model based on information received regarding subsequent resource propagations.

In some instances, while it is desirable to verify resource propagations in real-time, it may also be desirable to minimize usage of the quantum optimizer 670 (e.g., due to cost of use, availability, demand by other systems to use the quantum optimizer 670, and the like. Accordingly, the quantum optimizer 670 may also be configured to analyze the resource propagation information to generate a second model for verifying resource propagations. Unlike the first model described above, the second model is typically configured for real-time processing by a classical computer (e.g., by the resource propagation processing apparatus 610). Because the second model is typically configured for near real-time processing by a classical computer (e.g., processing within a few seconds or less), the second model is typically less complex and less precise than the first model. The second model is also typically configured to provide both an indication of whether a particular resource propagation should be verified as well as a confidence level of whether the particular resource propagation should be verified. When the confidence level is relatively high, the second model is expected to be sufficiently precise regarding whether a particular resource propagation should be verified. However, when the confidence level is not high, the indication provided by the second model of whether a particular resource propagation should be verified is likely unreliable.

Once the second model has been created by the quantum optimizer 670 (e.g., at the same time the first model is created), the second model is typically provided to the resource propagation processing apparatus 610. Thereafter, when the resource propagation processing apparatus 610 receives a resource propagation request, the resource propagation processing apparatus 610 initially analyzes information related to the resource propagation using the second model. If the confidence level provided by the second model is relatively high (e.g. by comparing the confidence level to a defined threshold), then the resource propagation processing apparatus 610 verifies the resource propagation based on the indication of whether the resource propagation should be verified provided by the second model. However, if the confidence level provided by the second model is not high, then the resource propagation processing apparatus 610 transmits the information related to the resource propagation request to the quantum optimizer 670 as previously described. By initially evaluating a resource propagation request using the second model (which may be processed in real-time by a classical computer), and then evaluating the resource propagation request using the first model (which may be processed in real-time by a quantum optimizer) if the confidence level provided by the second model is not high, resource propagation requests may be verified in real-time, while minimizing the usage of the quantum optimizer.

As evident from the preceding description, the system described herein represents an improvement in technology by analyzing resource propagation requests using a quantum optimizer in order to provide a real-time determination of whether to verify such resource propagation requests in an effort to minimize or eliminate attacks. Moreover, by initially evaluating resource propagation requests using a model that may be processed in real-time by a classical computer, and then evaluating the resource propagation requests using a model that may be processed in real-time by a quantum optimizer if the confidence level provided by the classical-computer model is not high, resource propagation requests may be verified in real-time, while minimizing the usage of the quantum optimizer.

In some embodiments, more than one network, system or communication pathway makes up one or more dedicated (or non-dedicated) communication channel(s) between one or more of the resource propagation device(s), the resource propagation processing system and/or other device(s) discussed herein. In some cases, only those pathways makeup the communication channel(s). In some embodiments, the resource propagation processing apparatus 610 serves as a control system and sends control signals that cause the resource propagation system(s) 500 to establish communication pathways with the resource propagation processing system 610. In some cases, the communication channel(s) is optimized so that information (e.g., resources, data, etc.) may be communicated more efficiently than is could be over a non-dedicated communication channel. For example, a non-dedicated communication channel may utilize insecure network connections or systems or may utilize unstable or noise-prone network connections or systems. Thus, when establishing a dedicated communication channel, the control system may optimize parameters of the dedicated communication channel such that the communication channel is less prone to interruption from security breach, other traffic, offline systems or the like. This may be done by, for example, designating certain systems on the network between the resource propagation processing system 600 and the resource propagation device(s) 500, respectively, as low-functioning, medium-functioning, or high-functioning network systems/hubs/connections/channels (collectively referred to as network systems). In various other embodiments, the number of categories of systems may be raised or lowered. For example, there may be five (5) distinct categories of systems. The various network systems may be categorized by one or more administrators and/or automatically based on one or more monitoring modules or applications running on the various systems. Such a monitoring system may flag any abnormalities in network communication such as an unintended offline network system, a security breach of a network system, a network communication affected negatively by noise or interference (in some cases based on a predetermined threshold of interference or communication errors). Thus, once various network systems are categorized, the resource propagation processing system 600) and/or the resource propagation device(s) 500 may optimize the dedicated communication channel by selecting appropriately categorized network systems for the communication channel. For example, the mobile device may establish a dedicated communication channel in order to send and receive authentication credentials and validation or newly issued tokens. When establishing the dedicated communication channel, the resource propagation devices 500 may only select high-functioning network systems in order to ensure that the high priority information may be reliably communicated from the resource propagation devices 500 to the resource propagation processing system 600 and vice versa. In another example, certain resource propagation devices (and/or their installed applications) are designated or categorized and always provided a dedicated (or non-dedicated) communication channel based on their respective categorization. In some embodiments, these configurations are considered a "hub and spoke" system wherein the resource propagation processing system 600 is the central hub and the resource propagation devices 500 serve as nodes on spokes of the system.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A computer system for information securities resource propagation analysis for attack prevention, comprising:
   a classical computer apparatus comprising:
      a processor;
      a memory; and
      a resource propagation processing application that is stored in the memory and executable by the processor;
   a quantum optimizer in operative communication with the classical computer apparatus, the quantum optimizer comprising:
      a quantum processor; and
      a quantum memory;
   wherein the resource propagation processing application is configured for:
      transmitting historical resource propagation information and historical attack information to the quantum optimizer;

receiving, from one or more resource propagation devices, present attributes; and transmitting the present attributes to the quantum optimizer;

wherein the quantum optimizer is configured for:

receiving the historical resource propagation information and historical attack information;

analyzing the historical resource propagation information and historical attack information to determine one or more indicative attributes that may be indicative of attacks;

receiving the present attributes transmitted from the resource propagation processing application;

comparing the present attributes to the indicative attributes to identify an identified potential attack;

identifying a first resource propagation device from amongst the one or more resource propagation devices corresponding to the identified potential attack; and transmitting, to the classical computing apparatus, an identity of the first resource propagation device for mitigation of the identified potential attack.

2. The computer system of claim 1, wherein the quantum optimizer is further configured for:

transmitting the indicative attributes to the classical computer apparatus for comparison to present attributes of present resource propagation for identification of potential attacks.

3. The computer system of claim 1, wherein the quantum optimizer is configured for:

determining one or more models for identification of potential attacks based on application of the one or more models to present information.

4. The computer system of claim 3, wherein the quantum optimizer is further configured for:

using the one or more models to determine the indicative attributes.

5. The computer system of claim 3, wherein the quantum optimizer is further configured for:

transmitting the one or more models to the classical computer apparatus;

wherein the resource propagation processing application is further configured for:

receiving the one or more models from the quantum optimizer; and input present attributes into the one or more models to identify potential attacks.

6. The computer system of claim 2, wherein the resource propagation processing application is further configured for:

receiving the indicative attributes from the quantum optimizer; and comparing the indicative attributes to present attributes to identify potential attacks.

7. The computer system of claim 6, wherein the resource propagation processing application is further configured for:

identifying a first resource propagation device having present attributes corresponding to an identified potential attack.

8. The computer system of claim 7, wherein the resource propagation processing application is further configured for:

transmitting a command configured to isolate the first resource propagation device.

9. The computer system of claim 7, wherein the resource propagation processing application is further configured for:

transmitting a command to mitigate the identified potential attack.

10. The computer system of claim 2, wherein the resource propagation processing application is further configured for:

receiving, from one or more resource propagation devices, present attributes; and comparing the indicative attributes to present attributes to identify potential attacks.

11. The computer system of claim 1, wherein the resource propagation processing application is further configured for:

receiving the identity of the first resource propagation device; and transmitting a command configured to mitigate the identified potential attack.

12. The computer system of claim 1, wherein the quantum optimizer is further configured for:

analyzing the historical resource propagation information and historical attack information to generate a model for verifying resource propagations, wherein the model is configured for real-time processing by the classical computer apparatus;

wherein the resource propagation processing application is further configured for:

receiving an indication of a present resource propagation;

identifying present attributes of the present resource propagation;

analyzing the present attributes using the model to determine (i) whether the present resource propagation is verified and (ii) a confidence of whether the present resource propagation is verified; and based on analyzing the present attributes using the model to determine (i) whether the present resource propagation is verified and (ii) the confidence of whether the present resource propagation is verified, determining an attack is unlikely and thereby allowing the present resource propagation to proceed without mitigation.

13. The computer system of claim 1, wherein the quantum optimizer is further configured for:

analyzing the historical resource propagation information and historical attack information to generate a model for verifying resource propagations, wherein the model is configured for real-time processing by the quantum processor;

wherein the resource propagation processing application is further configured for:

receiving an indication of a present resource propagation;

identifying present attributes of the present resource propagation; and transmitting the present attributes to the quantum processor for processing;

wherein the quantum optimizer is further configured for:

analyzing the present attributes using the model to determine (i) whether the present resource propagation is verified and (ii) a confidence of whether the present resource propagation is verified; and based on analyzing the present attributes using the model to determine (i) whether the present resource propagation is verified and (ii) the confidence of whether the present resource propagation is verified, determining an attack is unlikely and thereby allowing the present resource propagation to proceed without mitigation.

14. The computer system of claim 1, wherein the quantum optimizer is further configured for:

analyzing the historical resource propagation information and historical attack information to generate a first model for verifying resource propagations, wherein the first model is configured for real-time processing by the classical computer apparatus;

analyzing the historical resource propagation information and historical attack information to generate a second model for verifying resource propagations, wherein the second model is configured for real-time processing by the quantum processor; and transmitting the first model to the classical computer apparatus;

wherein the resource propagation processing application is further configured for:

receiving an indication of a present resource propagation;

identifying present attributes of the present resource propagation;

analyzing the present attributes using the first model to determine (i) whether the present resource propagation is verified and (ii) a confidence of whether the present resource propagation is verified;

based on analyzing the present attributes using the first model to determine (i) whether the present resource propagation is verified and (ii) the confidence of whether the present resource propagation is verified, determining that a quantum computing analysis is necessary to achieve a threshold confidence of whether the present resource propagation is verified; and in response, transmitting the present attributes to the quantum optimizer for analysis.

15. The computer system of claim 14, wherein the quantum optimizer is further configured for:

analyzing the present attributes using the second model to determine (i) whether the present resource propagation is verified and (ii) a confidence of whether the present resource propagation is verified; and based on analyzing the present attributes using the second model to determine (i) whether the present resource propagation is verified and (ii) the confidence of whether the present resource propagation is verified, transmitting to the classical computer apparatus an indication of whether the present resource propagation is verified.

16. The computer system of claim 15, wherein the resource propagation processing application is further configured for:

receiving the indication of whether the present resource propagation is verified; and in response to receiving an indication that the present resource propagation is not verified, transmitting a command configured to mitigate the identified potential attack.

17. The computer system of claim 15, wherein the resource propagation processing application is further configured for:

receiving the indication of whether the present resource propagation is verified; and in response to receiving an indication that the present resource propagation is verified, allowing the present resource propagation to proceed without mitigation.

18. A computer system for information securities resource propagation analysis for attack prevention, comprising:

a classical computer apparatus comprising:
a processor;
a memory; and
a resource propagation processing application that is stored in the memory and executable by the processor;

a quantum optimizer in operative communication with the classical computer apparatus, the quantum optimizer comprising:
a quantum processor; and
a quantum memory;

wherein the resource propagation processing application is configured for:

receiving historical resource propagation information and historical attack information from one or more resource propagation devices; and transmitting the historical resource propagation information and the historical attack information to the quantum optimizer;

wherein the quantum optimizer is configured for:

receiving the historical resource propagation information and historical attack information; and analyzing the historical resource propagation information and historical attack information to generate a first model for verifying resource propagations, wherein the first model is configured for real-time processing by the quantum processor;

wherein the resource propagation processing application is further configured for:

receiving an indication of a present resource propagation from one of the one or more resource propagation devices;

identifying present attributes of the present resource propagation; and transmitting the present attributes to the quantum optimizer;

wherein the quantum optimizer is further configured for:

analyzing the present attributes using the first model to determine (i) whether the present resource propagation is verified and (ii) a confidence of whether the present resource propagation is verified;

based on analyzing the present attributes using the first model to determine (i) whether the present resource propagation is verified, and (ii) the confidence of whether the present resource propagation is verified, determining a conclusion indicating whether attack mitigation should be initiated or the present resource propagation should be allowed to proceed without attack mitigation; and transmitting the conclusion to the classical computer apparatus.

19. A computer system for information securities resource propagation analysis for attack prevention, comprising:

a classical computer apparatus comprising:
a processor;
a memory; and
a resource propagation processing application that is stored in the memory and executable by the processor;

a quantum optimizer in operative communication with the classical computer apparatus, the quantum optimizer comprising:
a quantum processor; and
a quantum memory;

wherein the resource propagation processing application is configured for:

receiving an indication of a present resource propagation from one of one or more resource propagation devices;

identifying present attributes of the present resource propagation; and transmitting the present attributes to the quantum optimizer;

wherein the quantum optimizer is configured for:

analyzing the present attributes using a first model to determine (i) whether the present resource propagation is verified and (ii) a confidence of whether the present resource propagation is verified, wherein the first model was generated by correlating historical resource propagation information and historical attack information to identify resource propagation attributes indicative of potential attacks;

based on analyzing the present attributes using the first model to determine (i) whether the present resource propagation is verified and (ii) the confidence of whether the present resource propagation is verified, determining a conclusion indicating whether attack mitigation should be initiated or the present resource propagation should be allowed to proceed without attack mitigation; and transmitting the conclusion to the classical computer apparatus.

* * * * *